United States Patent
Yu (10) Patent No.: US 10,529,084 B2
(45) Date of Patent: Jan. 7, 2020

(54) IMAGE PROCESSING METHOD, ELECTRONIC DEVICE, AND NON-TRANSITORY COMPUTER READABLE STORAGE MEDIUM

(71) Applicant: HTC Corporation, Taoyuan (TW)

(72) Inventor: Wen-Hsiang Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 12 days.

(21) Appl. No.: 15/889,220

(22) Filed: Feb. 6, 2018

(65) Prior Publication Data

US 2019/0244377 A1 Aug. 8, 2019

(51) Int. Cl.
*G06T 7/55* (2017.01)
*H04N 5/232* (2006.01)
*H04N 1/32* (2006.01)

(52) U.S. Cl.
CPC .......... *G06T 7/55* (2017.01); *H04N 1/32128* (2013.01); *H04N 5/23258* (2013.01); *H04N 5/23287* (2013.01); *G06T 2207/10004* (2013.01); *H04N 2201/3215* (2013.01)

(58) Field of Classification Search
CPC ....................................................... G06T 7/55
USPC ......................................................... 348/142
See application file for complete search history.

(56) References Cited

U.S. PATENT DOCUMENTS

2015/0193971 A1* 7/2015 Dryanovski ............ G06T 17/05
345/419

* cited by examiner

*Primary Examiner* — Jeffery A Williams
(74) *Attorney, Agent, or Firm* — CKC & Partners Co., LLC (57) ABSTRACT

An image processing method includes: obtaining, a first image by a camera, and a first lens position by a position sensor at a first timestamp; obtaining, by an inertial measurement unit sensor, an IMU signal indicating a movement of the camera between the first timestamp and a second timestamp; obtaining, a second image by the camera, and a second lens position by the position sensor at the second timestamp; calculating, by a processing circuit, a relative geometry value of the first image and the second image according to the first lens position, the second lens position, and the IMU signal; and performing, by the processing circuit, a depth calculation to the first image and the second image based on the relative geometry value on the condition that the relative geometry value meets a geometry threshold.

20 Claims, 5 Drawing Sheets

Fig. 5

IMAGE PROCESSING METHOD, ELECTRONIC DEVICE, AND NON-TRANSITORY COMPUTER READABLE STORAGE MEDIUM

BACKGROUND

Technical Field

The present disclosure relates to an electronic device and an image processing method. More particularly, the present disclosure relates to the electronic device and the image processing method related to computer vision.

Description of Related Art

Nowadays, computer vision methods are widely used in various applications. For example, depth calculation may be applied to detect the distance of an object in the image.

SUMMARY

One aspect of the present disclosure is related to an image processing method. In accordance with some embodiments of the present disclosure, the image processing method includes: obtaining, a first image by a camera, and a first lens position by a position sensor at a first timestamp; obtaining, by an inertial measurement unit sensor, an IMU signal indicating a movement of the camera between the first timestamp and a second timestamp; obtaining, a second image by the camera, and a second lens position by the position sensor at the second timestamp; calculating, by a processing circuit, a relative geometry value of the first image and the second image according to the first lens position, the second lens position, and the IMU signal; and performing, by the processing circuit, a depth calculation to the first image and the second image based on the relative geometry value on the condition that the relative geometry value meets a geometry threshold.

Another aspect of the present disclosure is related to an electronic device. In accordance with some embodiments of the present disclosure, the electronic device includes a processing circuit, a camera electrically connected to the processing circuit, a position sensor electrically connected to the processing circuit, an inertial measurement unit sensor electrically connected to the processing circuit, a memory electrically connected to the processing circuit, and one or more programs. The one or more programs are stored in the memory and configured to be executed by the processing circuit. The one or more programs comprising instructions for: controlling the camera to obtain a first image and controlling the position sensor to obtain a first lens position at a first timestamp; controlling the inertial measurement unit sensor to obtain an IMU signal indicating a movement of the camera between the first timestamp and a second timestamp; controlling the camera to obtain a second image and controlling the position sensor to obtain a second lens position at the second timestamp; calculating a relative geometry value of the first image and the second image according to the first lens position, the second lens position, and the IMU signal; and performing a depth calculation to the first image and the second image based on the relative geometry value on the condition that the relative geometry value meets a geometry threshold.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling the camera to obtain a first image and controlling the position sensor to obtain a first lens position at a first timestamp; controlling the inertial measurement unit sensor to obtain an IMU signal indicating a movement of the camera between the first timestamp and a second timestamp; controlling the camera to obtain a second image and controlling the position sensor to obtain a second lens position at the second timestamp; calculating a relative geometry value of the first image and the second image according to the first lens position, the second lens position, and the IMU signal; and performing a depth calculation to the first image and the second image based on the relative geometry value on the condition that the relative geometry value meets a geometry threshold.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
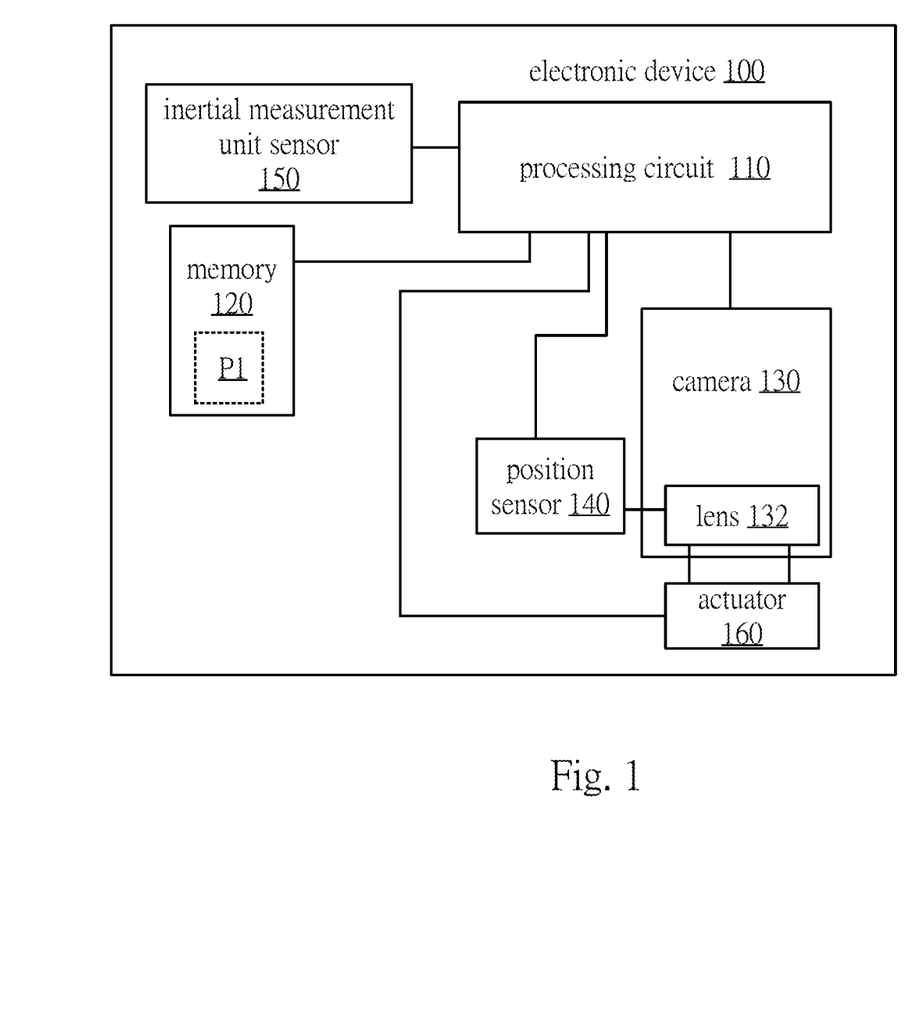
FIG. 1 is a schematic block diagram illustrating an electronic device in accordance with some embodiments of the present disclosure.

Reference is made to FIG. 1. FIG. 1 is a schematic block diagram illustrating an electronic device 100 in accordance with some embodiments of the present disclosure. The electronic device 100 may be configured to capture a plurality images in sequence, and perform a depth calculation to the images to obtain 3D information, that is, the depth information of the images. Accordingly, various image processes may be performed according to the depth information of the objects and/or pixels in the images.

For example, in some embodiments, the electronic device 100 may be a smartphone, a tablet, a laptop or other electronic devices with a built-in digital camera device. In some other embodiments, the electronic device 100 may be applied in a virtual reality (VR)/mixed reality (MR)/augmented reality (AR) system to provide images with accurate depth information of the objects and/or pixels in the image. For example, the electronic device 100 may be realized by, a standalone head mounted device (HMD) or VIVE HMD. In detail, the standalone HMD may handle such as processing location data of position and rotation, graph processing or others data calculation.

As shown in FIG. 1, the electronic device 100 includes a processing circuit 110, a memory 120, a camera 130, a position sensor 140, an inertial measurement unit sensor 150, and an actuator 160. One or more programs P1 are stored in the memory 120 and configured to be executed by the processing circuit 110, in order to perform the depth calculation.

In structural, the memory 120, the camera 130, the position sensor 140, the inertial measurement unit sensor 150, and the actuator 160 are respectively electrically connected to the processing circuit 110.

Specifically, the actuator 160 is connected to a lens 132 of the camera 130, in order to move the lens 132 according to a control signal received from the processing circuit 110. Thus, the relative position of the lens 132 to the camera 130 may be different during the operation. Variation of the position of the lens 132 may be detected by the position sensor 140 correspondingly. By controlling the actuator 160 to adjust the position of the lens 132, the images taken by the camera 130 may be stable under motion, such as handshaking, head-shaking, vibration in the vehicle, etc. Accordingly, the Optical Image stabilization (OIS) may be achieved by the cooperation of the processing circuit 110, the inertial measurement unit sensor 150, and the actuator 160.

In some embodiments, the processing circuit 110 can be realized by, for example, one or more processors, such as central processors and/or microprocessors, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

Figure 2:
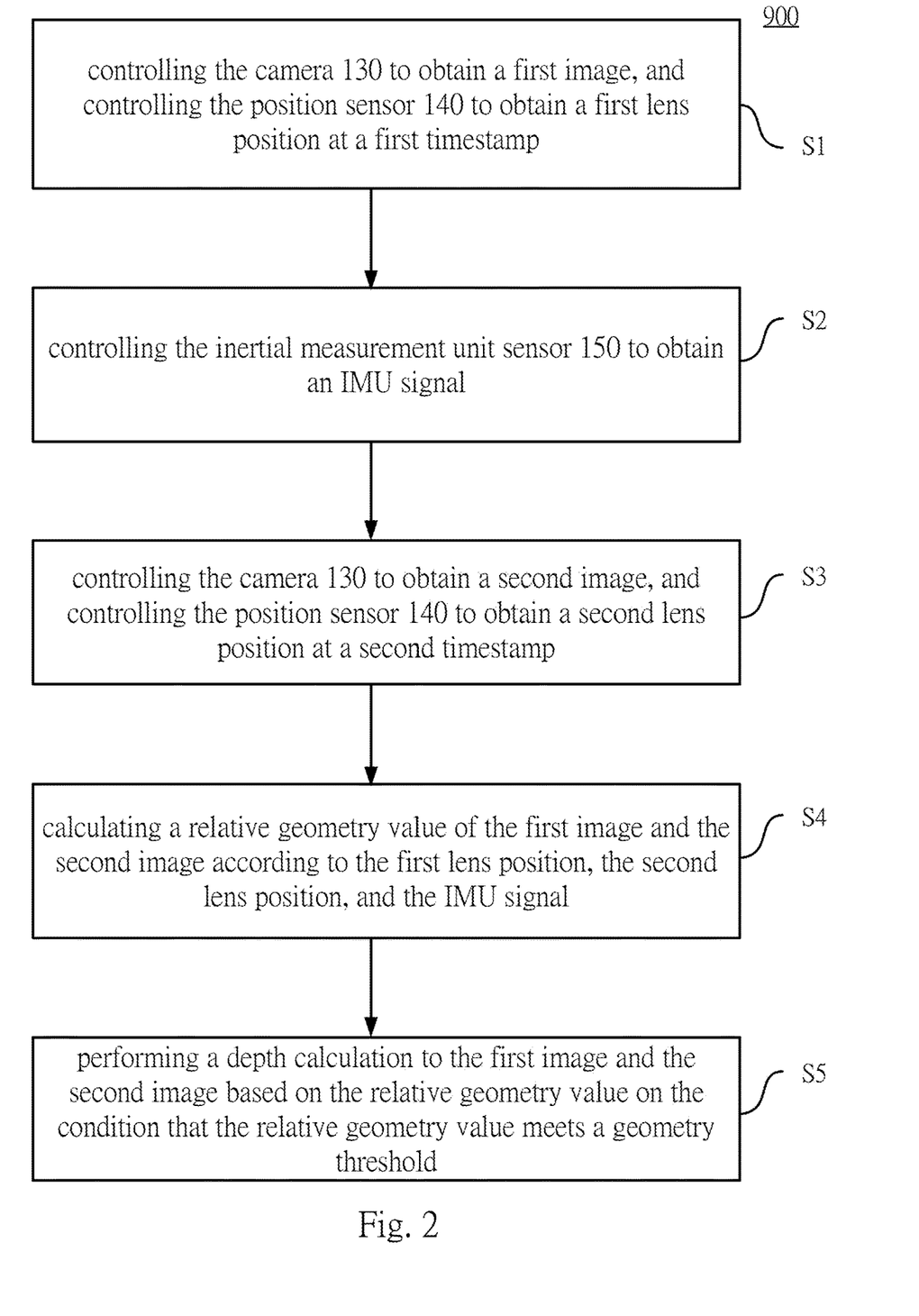
FIG. 2 is a flowchart illustrating an image processing method in accordance with some embodiments of the present disclosure.

For better understanding of the present disclosure, the detailed operation of the electronic device 100 will be discussed in accompanying with the embodiments shown in FIG. 2. FIG. 2 is a flowchart illustrating an image processing method 900 in accordance with some embodiments of the present disclosure. It should be noted that the image processing method 900 can be applied to an electrical device having a structure that is the same as or similar to the structure of the electronic device 100 shown in FIG. 1. To simplify the description below, the embodiments shown in FIG. 1 will be used as an example to describe the image processing method 900 according to some embodiments of the present disclosure. However, the present disclosure is not limited to application to the embodiments shown in FIG. 1.

As shown in FIG. 2, the image processing method 900 includes operations S1, S2, S3, S4, and S5. In operation S1, the processing circuit 110 is configured to control the camera 130 to obtain a first image, and control the position sensor 140 to obtain a first lens position at a first timestamp.

In operation S2, the processing circuit 110 is configured to control the inertial measurement unit sensor 150 to obtain an IMU signal. The IMU signal indicates a movement of the camera 130 between the first timestamp and a second timestamp.

In operation S3, the processing circuit 110 is configured to control the camera 130 to obtain a second image, and control the position sensor 140 to obtain a second lens position at the second timestamp.

In operation S4, the processing circuit 110 is configured to calculate a relative geometry value of the first image and the second image according to the first lens position, the second lens position, and the IMU signal.

In operation S5, the processing circuit 110 is configured to perform a depth calculation to the first image and the second image based on the relative geometry value on the condition that the relative geometry value meets a geometry threshold. Specifically, in computer vision, the disparity/parallax may be calculated from the first image and the second image. The baseline, denoting the distance between the positions of the camera capturing the images, affects the disparity of a corresponding point in two different images on their respective image planes. For example, a greater baseline value may result in a greater pixel shift of the corresponding point across the two images, and a smaller baseline value may result in a smaller pixel shift of the corresponding point across the two images.

By using the first image and the second image of the same scene obtained from different angles, it is possible to triangulate the distance to an object. That is, if the object is far away, the disparity between two images will be small. On the other hand, if the object is near, the disparity between two images will be large. As the baseline increases, the disparity increases due to the greater angle, and the accuracy of the depth calculation may be increased.

Figure 3:
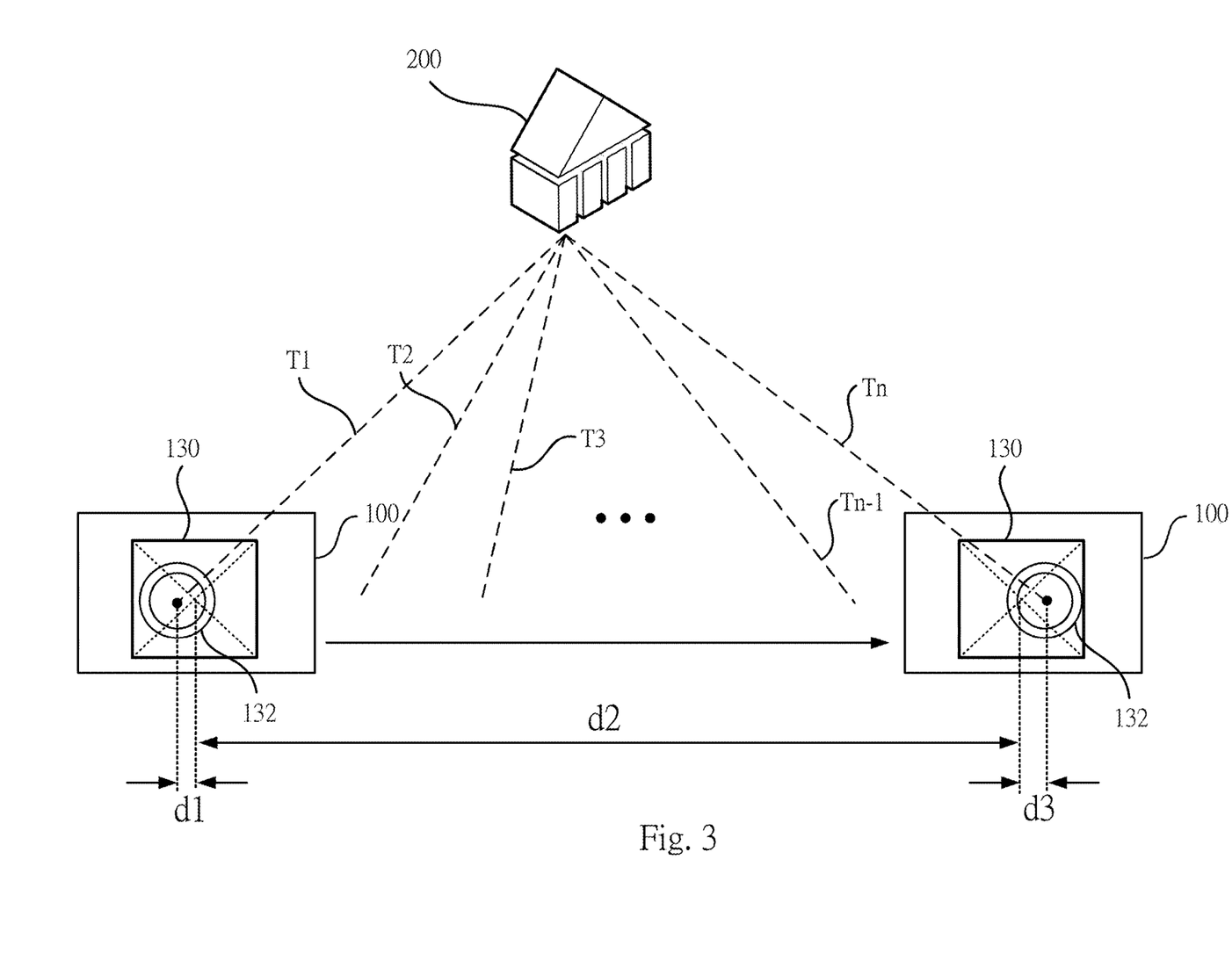
FIG. 3 is a diagram illustrating the operation of the electronic device according to some embodiments of the present disclosure.

Reference is made to FIG. 3. FIG. 3 is a diagram illustrating the operation of the electronic device 100 according to some embodiments of the present disclosure.

As shown in FIG. 3, the camera 130 may be used for capturing a plurality of images of a target object 200 at different positions with a motion of the camera 130 during timestamps T1~Tn.

During the motion of the camera 130, an Optical Image Stabilization (OIS) is enabled to the camera 130 by controlling the movement of the actuator 160 connected to the lens 132 of the camera 130, in order to reduce blurring or the images taken by the camera 130. That is, in some embodiments, during the first timestamp (e.g., timestamp T1) to the second timestamp (e.g., timestamp Tn), the Optical Image Stabilization is enabled and positions of the lens 132 may be varied to compensate the undesired shaking.

As shown in FIG. 3, at the timestamp T1, a first image may be obtained by the camera 130. At the same time, a first lens position indicating the position of the lens 132 may be obtained by the position sensor 140. Thus, the value of the compensating distance d1 at the timestamp T1 may be received by the processing circuit 110. Specifically, the position sensor 140 may be implemented by various devices such as Hall sensors, but is not limited thereto.

Since the inertial measurement unit sensor 150 may output the IMU signal to indicate the movement of the camera 130, a moving distance d2 of the camera 130 between the timestamp T1 and the timestamp Tn may be calculated and received by the processing circuit 110.

At the timestamp Tn, the second image may be obtained by the camera 130. At the same time, a second lens position indicating the position of the lens 132 may be obtained by the position sensor 140. Thus, the value of the compensating distance d3 at the timestamp Tn may also be received by the processing circuit 110.

Therefore, the relative geometry value of the first image and the second image may be correspondingly calculated and determined according to the first lens position, the second lens position and the IMU signal, since the distances d1, d2, and d3 are obtained.

Specifically, in some embodiments, the processing circuit 110 may be configured to determine the second image is taken at which one of the timestamps T2~Tn according to the relative geometry value calculated. Alternatively stated, in some embodiments, the processing circuit 110 may be configured to calculate a baseline distance of the camera 130 between two different timestamps, and wait until the baseline distance is greater than a predetermined value to obtain the second image. Thus, the baseline distance between the first image and the second image may be greater than the predetermined value, and thus the depth calculation based on the first image and the second image may be performed more accurately with sufficient parallax or disparity between two images.

For example, at the time stamp T2, the processing circuit 110 may determine, based on the current lens position and the current IMU signal, that the baseline distance between the first image and the second image does not reach the predetermined value, and thus the depth calculation is not performed using the two images taken at the timestamps T1 and T2, since the parallax or disparity between the timestamps T1 and T2 may be not sufficient to provide accurate depth information.

Accordingly, by taking the lens positions at different timestamps and the IMU signal between different timestamp into account, the depth calculation performed based on the relative geometry value between two timestamps may be accurate, while the optical image stabilization is enabled to reduce blurring and enhance the quality of the images. Furthermore, since the predetermined value may be configured dynamically, the baseline of images may be varied to satisfy the accuracy or other requirements of various applications. After the depth calculation is performed, a depth map including 3D information for pixels and/or objects identified in the image may be generated. For example, the depth map of the image may be used for further image analysis and process, or used to perform interactive operations in the VR/MR/AR systems.

Figure 4:
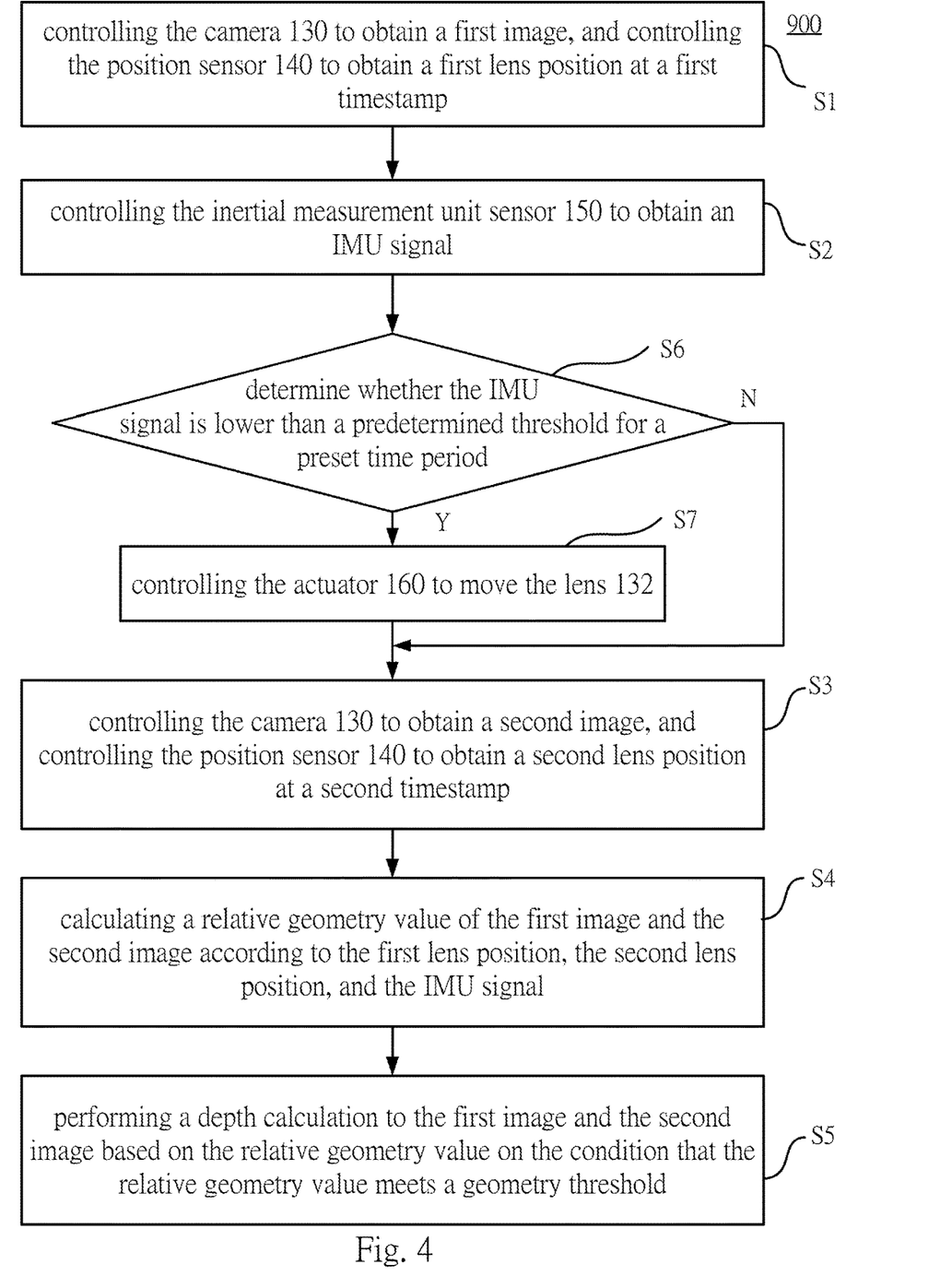
FIG. 4 is a flowchart illustrating the image processing method 900 in accordance with some other embodiments of the present disclosure.

Reference is made to FIG. 4. FIG. 4 is a flowchart illustrating the image processing method 900 in accordance with some other embodiments of the present disclosure. Similarly, in order to simplify the description below, the embodiments shown in FIG. 1 will be used as an example to describe the image processing method 900, but the present disclosure is not limited thereto.

Compared to the embodiments shown in FIG. 2, in the present embodiments, the image processing method 900 further includes operations S6 and S7. In the operation S6, the processing circuit 110 is further configured to determine whether the IMU signal received from the inertial measurement unit sensor 150 is lower than a predetermined threshold for a preset time period. Alternatively stated, the processing circuit 110 is configured to determine whether the electronic device 100 and the camera 130 are still and stable without movement. Next, in the operation S7, the processing circuit 110 is configured to control the actuator 160 connected to the lens 132 of the camera 130 to move the lens 132, in order to obtain the first image and the second image with disparity on the condition that the IMU signal is lower than the predetermined threshold.

That is, in some embodiments, the electronic device 100 may actively capture two or more images with disparity in order to perform depth calculation on the condition that the electronic device 100 being still.

Specifically, in some embodiments, the processing circuit 110 may control the speed of the actuator 160 to be lower than a shutter speed of the camera 130, such that the OIS may still be enabled to reduce blurring of the motion. In addition, in some embodiments, the processing circuit 110 may control the lens 132 to move in a horizontal direction perpendicular to an optical axis of the lens 132, as the direction to achieve the Optical Image Stabilization, but the present disclosure is not limited thereto. In some other embodiments, the processing circuit 110 may control the lens 132 to move in various directions perpendicular to the optical axis of the lens 132.

Accordingly, the electronic device 100 may obtain the 3D information content of the image may be created using a single camera 130, with or without the movement of the electronic device 100, with the OIS activated.

Figure 5:
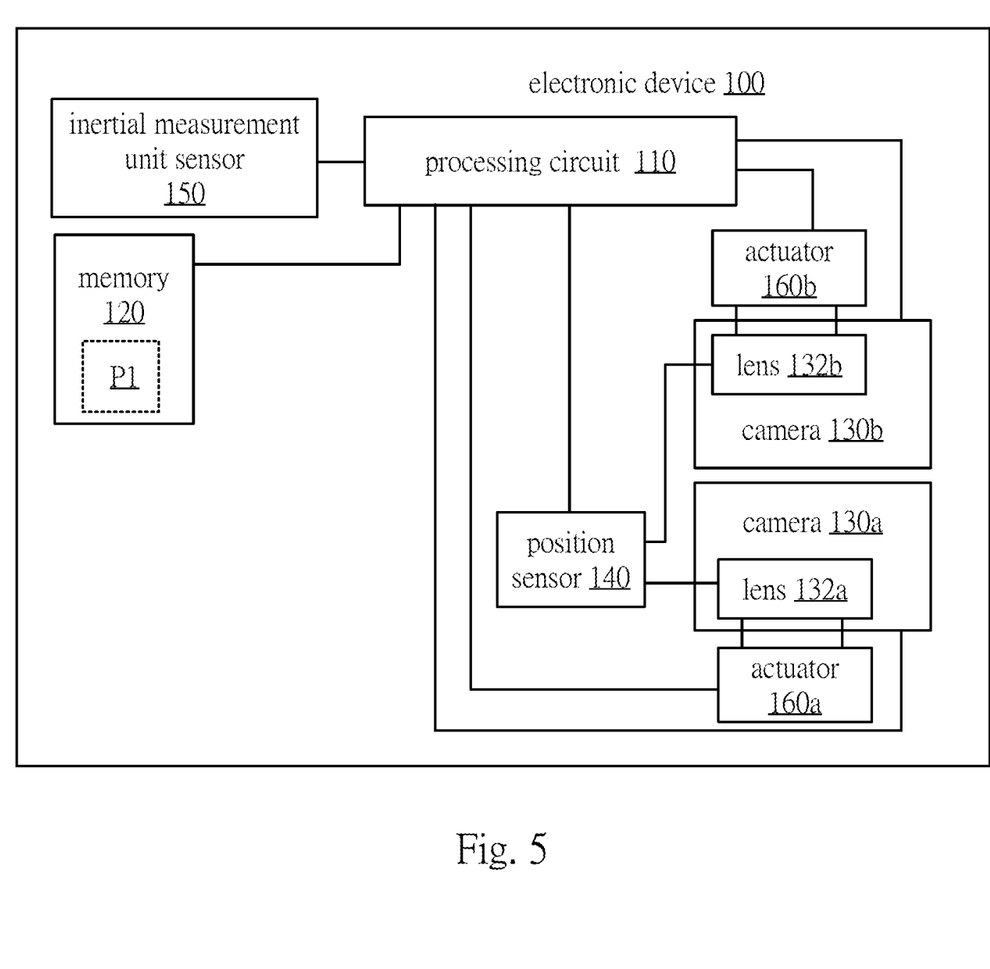
FIG. 5 is a schematic block diagram illustrating the electronic device 100 in accordance with some other embodiments of the present disclosure.

Reference is made to FIG. 5. FIG. 5 is a schematic block diagram illustrating the electronic device 100 in accordance with some other embodiments of the present disclosure. Compared to the embodiments shown in FIG. 1, in the embodiments of FIG. 5, the electronic device 100 may include two or more cameras 130a and 130b, instead of one single camera.

The cameras 130a and 130b may respectively include lens 132a and 132b, and be configured to perform the similar function as stated in the above embodiments with corresponding actuators 160a and 160b. As shown in FIG. 5, the position sensor is coupled to the lens 132a and 132b and configured to detect the position of the lens 132a and 132b respectively. In addition, the processing circuit 110 may be configured to further perform the depth calculation based on images captured by different cameras 130a and 130b.

Specifically, the processing circuit 110 may control the camera 130a to obtain the second image, control the camera 130b to obtain a third image, and control the position sensor 140 to obtain the second lens position of the camera 130a and a third lens position of the camera 130b at the second timestamp.

Thus, the processing circuit 110 may perform the depth calculation to the second image captured by the camera 130a and the third image captured by the camera 130b based on a fixed baseline between the camera 130a and the camera 130b. Alternatively stated, the image processing method 900 in various embodiments may be compatible with the electronic device 100 with multi-cameras.

In some embodiments, the depth calculation may be performed based on two images with a varying baseline which are captured by the same camera, and/or based on two images with a fixed baseline which are captured by different cameras. Accordingly, with the depth calculation using images having the fixed baseline, the 3D information created may be more reliable since the baseline is a known constant value for the processing circuit 110.

It should be noted that, in some embodiments, the image processing method 900 may be implemented as a computer program. When the computer program is executed by a computer, an electronic device, or the processing circuit 110 in FIG. 1, this executing device performs the image processing method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned image processing method 900, no particular sequence is required unless otherwise specified. Moreover, the operations may also be performed simultaneously or the execution times thereof may at least partially overlap.

Furthermore, the operations of the image processing method 900 may be added to, replaced, and/or eliminated as appropriate, in accordance with various embodiments of the present disclosure.

Through the operations of various embodiments described above, an image processing method is implemented to generate 3D content/depth information for the images captured by one or more cameras of the electronic device, and the OIS function may be enabled during the process to reduce blurring of the images. Since the lens positions of the camera and the IMU signal are taken into account together, the accurate baseline of the images may be calculated and obtained. Accordingly, the quality of the image and the accuracy of the depth information may be improved. In addition, the electronic device may actively move the lens during a tiny-motion or a no-motion state, in order to perform the depth calculation.

Although the present disclosure has been described in considerable detail with reference to certain embodiments thereof, other embodiments are possible. Therefore, the scope of the appended claims should not be limited to the description of the embodiments contained herein.

What is claimed is:

1. An image processing method comprising:
   obtaining, a first image by a camera, and a first lens position by a position sensor at a first timestamp;
   obtaining, by an inertial measurement unit sensor, an IMU signal indicating a movement of the camera between the first timestamp and a second timestamp;
   obtaining, a second image by the camera, and a second lens position by the position sensor at the second timestamp;
   calculating, by a processing circuit, a sum of two compensating distances and a moving distance according to the first lens position, the second lens position, and the IMU signal; and
   performing, by the processing circuit, a depth calculation to the first image and the second image based on the sum of two compensating distances and the moving distance on the condition that the sum of two compensating distances and the moving distance meets a geometry threshold.

2. The image processing method of claim 1, wherein calculating the sum of two compensating distances and the moving distance comprises:
   calculating a baseline distance between the camera at the first timestamp and at the second timestamp, wherein the geometry threshold is met on the condition that the baseline distance is greater than a predetermined value.

3. The image processing method of claim 1, further comprising:
   moving, by an actuator connected to a lens of the camera, the lens to obtain the first image and the second image with disparity on the condition that the IMU signal is lower than a predetermined threshold.

4. The image processing method of claim 3, wherein a speed of the actuator is lower than a shutter speed of the camera.

5. The image processing method of claim 3, wherein the lens is configured to move in a horizontal direction perpendicular to an optical axis of the lens.

6. The image processing method of claim 1, further comprising:
   enabling an optical image stabilization to the camera during the first timestamp to the second timestamp.

7. The image processing method of claim 1, further comprising:
   obtaining, a third image by a second camera, and a third lens position by the position sensor at the second timestamp; and
   performing, by the processing circuit, the depth calculation to the second image and the third image based on a fixed baseline between the camera and the second camera.

8. An electronic device, comprising:
   a processing circuit;
   a camera electrically connected to the processing circuit;

a position sensor electrically connected to the processing circuit;

an inertial measurement unit sensor electrically connected to the processing circuit;

a memory electrically connected to the processing circuit; and one or more programs, wherein the one or more programs are stored in the memory and configured to be executed by the processing circuit, the one or more programs comprising instructions for:

controlling the camera to obtain a first image and controlling the position sensor to obtain a first lens position at a first timestamp;

controlling the inertial measurement unit sensor to obtain an IMU signal indicating a movement of the camera between the first timestamp and a second timestamp;

controlling the camera to obtain a second image and controlling the position sensor to obtain a second lens position at the second timestamp;

calculating a sum of two compensating distances and a moving distance of the first image and the second image according to the first lens position, the second lens position, and the IMU signal; and performing a depth calculation to the first image and the second image based on the sum of two compensating distances and the moving distance on the condition that the sum of two compensating distances and the moving distance meets a geometry threshold.

9. The electronic device as claimed in claim 8, wherein the one or more programs further comprise instructions for:

calculating a baseline distance between the camera at the first timestamp and at the second timestamp, wherein the geometry threshold is met on the condition that the baseline distance is greater than a predetermined value.

10. The electronic device as claimed in claim 8, further comprising:

an actuator connected to a lens of the camera; and wherein the one or more programs further comprise instructions for:

controlling the actuator to move the lens to obtain the first image and the second image with disparity on the condition that the IMU signal is lower than a predetermined threshold.

11. The electronic device as claimed in claim 10, wherein a speed of the actuator is lower than a shutter speed of the camera.

12. The electronic device as claimed in claim 10, wherein the lens is configured to move in a horizontal direction perpendicular to an optical axis of the lens.

13. The electronic device as claimed in claim 8, wherein the one or more programs further comprise instructions for:

enabling an optical image stabilization to the camera during the first timestamp to the second timestamp.

14. The electronic device as claimed in claim 8, further comprising:

a second camera electrically connected to the processing circuit; and wherein the one or more programs further comprise instructions for:

controlling the second camera to obtain a third image and controlling the position sensor to obtain a third lens position at the second timestamp; and performing the depth calculation to the second image and the third image based on a fixed baseline between the camera and the second camera.

15. A non-transitory computer readable storage medium storing one or more programs, comprising instructions, which when executed, causes a processing circuit to perform operations comprising:

controlling a camera to obtain a first image and controlling a position sensor to obtain a first lens position at a first timestamp;

controlling an inertial measurement unit sensor to obtain an IMU signal indicating a movement of the camera between the first timestamp and a second timestamp;

controlling the camera to obtain a second image and controlling the position sensor to obtain a second lens position at the second timestamp;

calculating a sum of two compensating distances and a moving distance of the first image and the second image according to the first lens position, the second lens position, and the IMU signal; and performing a depth calculation to the first image and the second image based on the sum of two compensating distances and the moving distance on the condition that the sum of two compensating distances and the moving distance meets a geometry threshold.

16. The non-transitory computer readable storage medium as claimed in claim 15, further comprising instructions, which when executed, causes the processing circuit to further perform operations comprising:

calculating a baseline distance between the camera at the first timestamp and at the second timestamp, wherein the geometry threshold is met on the condition that the baseline distance is greater than a predetermined value.

17. The non-transitory computer readable storage medium as claimed in claim 15, further comprising instructions, which when executed, causes the processing circuit to further perform operations comprising:

controlling an actuator connected to a lens of the camera to move the lens to obtain the first image and the second image with disparity on the condition that the IMU signal is lower than a predetermined threshold.

18. The non-transitory computer readable storage medium as claimed in claim 17, further comprising instructions, which when executed, causes the processing circuit to further perform operations comprising:

controlling the actuator to move the lens in a horizontal direction perpendicular to an optical axis of the lens with a speed lower than a shutter speed of the camera.

19. The non-transitory computer readable storage medium as claimed in claim 15, further comprising instructions, which when executed, causes the processing circuit to further perform operations comprising:

enabling an optical image stabilization to the camera during the first timestamp to the second timestamp.

20. The non-transitory computer readable storage medium as claimed in claim 15, further comprising instructions, which when executed, causes the processing circuit to further perform operations comprising:

controlling a second camera to obtain a third image and controlling the position sensor to obtain a third lens position at the second timestamp; and performing the depth calculation to the second image and the third image based on a fixed baseline between the camera and the second camera.

* * * * *